US008554352B2

(12) United States Patent
Boltyenkov et al.

(10) Patent No.: US 8,554,352 B2
(45) Date of Patent: Oct. 8, 2013

(54) METHOD OF GENERATING AN OPTIMIZED VENTING CHANNEL IN A HEARING INSTRUMENT

(75) Inventors: Artem Boltyenkov, Lawrenceville, NJ (US); Fred McBagonluri, East Windsor, NJ (US); Andreas Reh, Princeton, NJ (US); Anthony Strano, Highland Park, NJ (US)

(73) Assignee: Siemens Hearing Instruments, Inc., Piscataway, NJ (US)

( * ) Notice: Subject to any disclaimer, the term of this patent is extended or adjusted under 35 U.S.C. 154(b) by 1189 days.

(21) Appl. No.: 12/436,834

(22) Filed: May 7, 2009

(65) Prior Publication Data

US 2010/0286964 A1 Nov. 11, 2010

(51) Int. Cl.
*G06F 19/00* (2011.01)

(52) U.S. Cl.
USPC .............................. 700/118; 700/98; 700/163

(58) Field of Classification Search
None
See application file for complete search history.

(56) References Cited

U.S. PATENT DOCUMENTS

| | | | | |
|---|---|---|---|---|
| 5,487,012 | A * | 1/1996 | Topholm et al. | 700/163 |
| 6,748,093 | B2 * | 6/2004 | Topholm | 381/322 |
| 6,920,414 | B2 * | 7/2005 | Topholm | 703/1 |
| 7,050,876 | B1 * | 5/2006 | Fu et al. | 700/118 |
| 7,328,080 | B2 * | 2/2008 | Fu et al. | 700/118 |
| 7,424,122 | B2 * | 9/2008 | Ryan | 381/322 |
| 7,447,556 | B2 * | 11/2008 | McBagonluri et al. | 700/98 |
| 7,555,356 | B2 * | 6/2009 | Martin Roth et al. | 700/118 |
| 7,609,259 | B2 * | 10/2009 | McBagonluri et al. | 345/419 |
| 7,672,823 | B2 * | 3/2010 | Nikles et al. | 703/7 |
| 7,694,418 | B2 * | 4/2010 | Topholm | 29/896.21 |
| 7,991,594 | B2 * | 8/2011 | Unal et al. | 703/2 |
| 8,032,337 | B2 * | 10/2011 | Deichmann et al. | 703/1 |
| 8,065,118 | B2 * | 11/2011 | McBagonluri et al. | 703/2 |
| 8,086,427 | B2 * | 12/2011 | Fang et al. | 703/2 |
| 8,150,542 | B2 * | 4/2012 | Roth et al. | 700/118 |
| 8,180,085 | B2 * | 5/2012 | Saltykov et al. | 381/324 |
| 8,199,952 | B2 * | 6/2012 | Boltyenkov et al. | 381/328 |
| 8,265,316 | B2 * | 9/2012 | Saltykov et al. | 381/325 |
| 2002/0136420 | A1 * | 9/2002 | Topholm | 381/312 |
| 2002/0196954 | A1 * | 12/2002 | Marxen et al. | 381/312 |
| 2003/0021434 | A1 * | 1/2003 | Hessel et al. | 381/312 |
| 2005/0088435 | A1 * | 4/2005 | Geng | 345/419 |
| 2007/0127756 | A1 * | 6/2007 | Slabaugh et al. | 381/328 |
| 2007/0201713 | A1 * | 8/2007 | Fang et al. | 381/322 |
| 2009/0097682 | A1 * | 4/2009 | McBagonluri et al. | 381/322 |

FOREIGN PATENT DOCUMENTS

EP 1356709 B1 * 10/2008

* cited by examiner

*Primary Examiner* — Kavita Padmanabhan
*Assistant Examiner* — Christopher E Everett
(74) *Attorney, Agent, or Firm* — Peter Kendall

(57) ABSTRACT

A computerized method is provided for designing a vent in a hearing aid housing shell based on an image of a patient's ear canal impression, and wherein a program is provided on a computer-readable medium. With the program, an image of a starter housing shell based on the image of the patient's ear canal impression is created which is longer than a final version of the housing shell to be created. A starter vent running from an inner canal end near the patient's ear drum to an outer end of the starter housing shell is placed inside the shell. Components are then placed substantially as deep as possible inside the starter shell but lying outside of the starter vent. Portions of the starter shell lying beyond where a faceplate is to be mounted are removed and the faceplate is mounted. The starter vent is then grown larger so that it fills substantially all space inside the shell without interfering with the components.

3 Claims, 2 Drawing Sheets

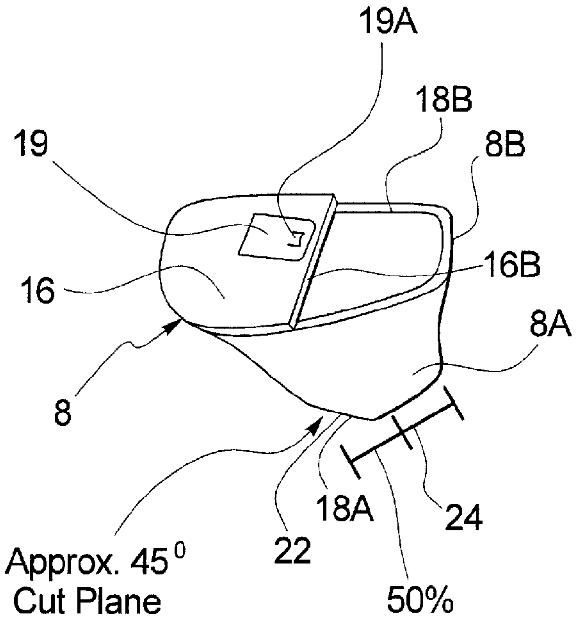
FIG. 4
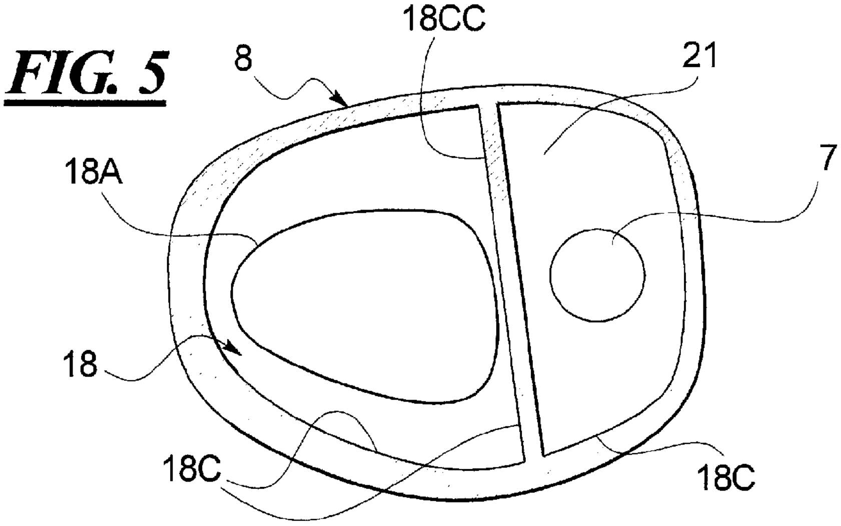
FIG. 5
FIG. 6
| Shell Type | Vent-as-Large-as-Possible maximal cross-section | Vent-as-Large-as-Possible minimal cross-section |
|---|---|---|
| CIC | 1.8 mm^2 | 0.8 mm^2 |
| Mini-Canal | 2.0 mm^2 | 1.0 mm^2 |
| Canal | 3.2 mm^2 | 1.2 mm^2 |
| Half-Shell | 4.4 mm^2 | 1.4 mm^2 |
| Full-Shell | 5.6 mm^2 | 1.6 mm^2 |

METHOD OF GENERATING AN OPTIMIZED VENTING CHANNEL IN A HEARING INSTRUMENT

BACKGROUND

A vent (also referenced to herein as a "venting channel") is an important part of a hearing aid. A vent is required to provide air circulation and minimize occlusion. If a vent is not provided, a user will likely have an uneasy feeling caused by an unequal pressure differential present in a space between the users ear drum and an inner ear canal end of the hearing aid housing compared to the atmospheric pressure external to the hearing aid housing outwardly of the ear. Users have described this uneasy feeling as an unnatural pressure differential. Users have also complained of what has been described as an unnatural hollow sound when the hearing aid is used if no vent is provided. Furthermore, care must be given in choosing the size of the vent since if the vent is too large, undesirable acoustic feedback may occur. When marketing experts in the hearing aid industry are asked which shell they would consider ideal, many of them will indicate a shell as small as possible, but with a vent as big as possible. The term "shell" used herein means an outermost wall of the hearing aid housing.

A "collection vent" is a known prior art vent in hearing aids which starts as a regular round vent at a faceplate outer side of the hearing aid (also called a "starter vent" hereafter) and continues some distance as a round vent and then increases in diameter gradually until some size specified by a designer and which terminates at the canal side of the hearing aid near the ear drum.

SUMMARY

It is an object to provide an automated software design method for a hearing aid which designs a vent-as-large-as-possible, and which takes as much space as possible in a housing shell of the hearing aid.

A computerized method is provided for designing a vent in a hearing aid housing shell based on an image of a patient's ear canal impression, and wherein a program is provided on a computer-readable medium. With the program, an image of a starter housing shell based on the image of the patient's ear canal impression is created which is longer than a final version of the housing shell to be created. A starter vent running from an inner canal end near the patient's ear drum to an outer end of the starter housing shell is placed inside the shell. Components are then placed substantially as deep as possible inside the starter shell but lying outside of the starter vent. Portions of the starter shell lying beyond where a faceplate is to be mounted are removed and the faceplate is mounted. The starter vent is then grown larger so that it fills substantially all space inside the shell without interfering with the components.

BRIEF DESCRIPTION OF THE DRAWINGS

FIG. 4 is a side perspective view of the hearing aid housing shell of FIG. 2;

FIG. 5 is a cross-sectional view taken along line V-V of FIG. 3 showing a portion of the vent-as-large-as-possible at the cross-section; and FIG. 6 is a table showing vertically shell type and horizontally maximal and minimal cross-section size of the vent-as-large-as-possible for different shell types.

DESCRIPTION OF THE PREFERRED EMBODIMENT

Figure 1:
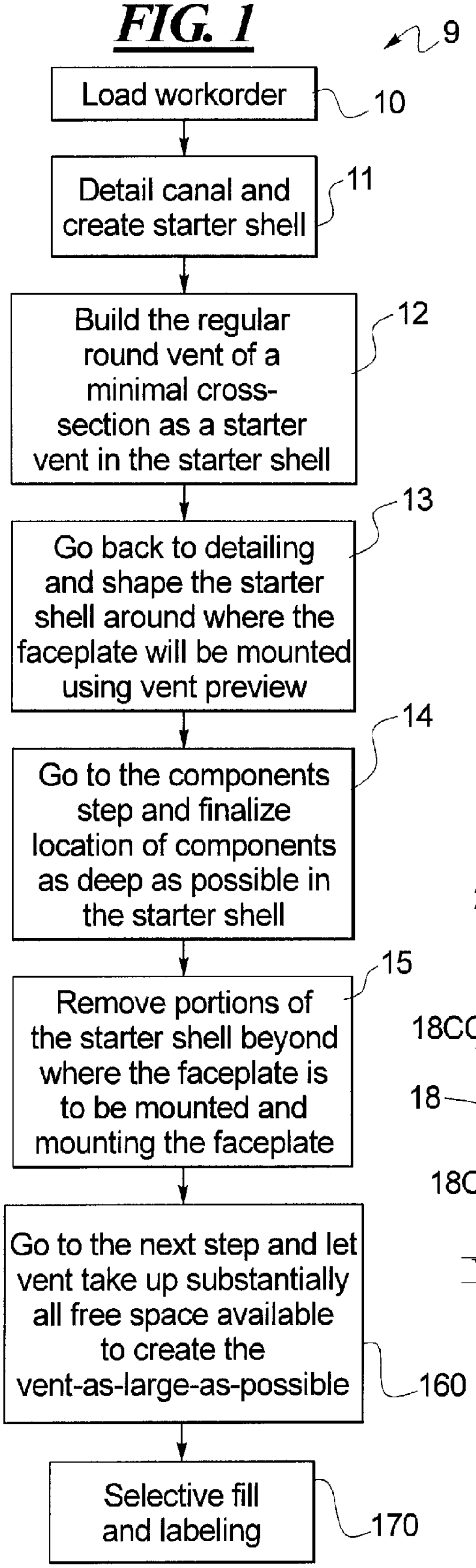
FIG. 1 is a flow chart of software in the computer for automatic creation of an optimized venting channel (vent) in a hearing aid instrument.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

When the term "venting channel" or "vent" is used hereafter, it means a structure inside the shell that permits air flow between the inner ear canal near the ear drum and the outside atmosphere where the user is located.

When the acronym CIC is used hereafter, it means completely-in-the-canal.

A main goal is to provide an automated software design method which provides a vent of a biggest possible size, while having the shell of the hearing aid of a smallest possible size. A size of the shell is a more important constraint than a size of the vent. A big vent is desired by a patient to improve air circulation in the ear and to minimize the occlusion effect. The occlusion effect is minimized as the vent acoustic mass is decreased.

The vent designed by the present software techniques of the preferred embodiment is hereinafter known as the "vent-as-large-as-possible" and alternately is also referred to as a "size-maximized vent".

In a vent designed as-large-as-possible the occlusion effect is comprised of two major sub-functionalities:

1. building the vent-as-large-as-possible for a given location of the components; and 2. insuring insertability of components principally including a receiver in the shell.

Figure 3:
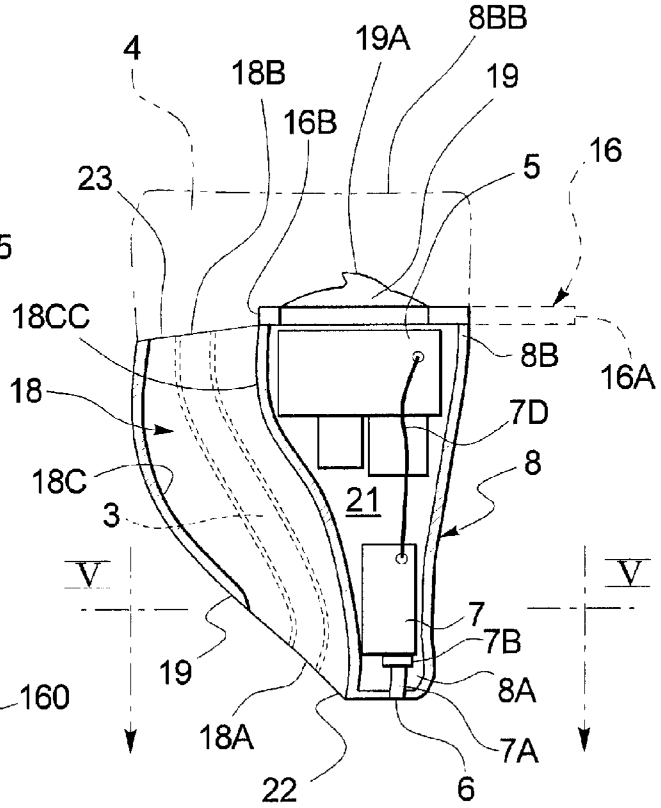
FIG. 3 is a cross-sectional view taken along line III-III in FIG. 2 showing a side profile of the hearing aid housing shell of FIG. 2.

The receiver 7 and other components 5 are located in the housing shell as shown in FIG. 3 and discussed hereafter. The receiver emits sound into the ear of the patient via a receiver tube 7A which runs from a receiver spout 7B of the receiver 7 where sound exits the receiver 7, and runs from there to a receiver hole 6, which is a hole on the shell 8 close to an end 18A of the vent 18 at an innermost end of the housing shell near the ear drum as shown in FIG. 3.

As shown in FIG. 1, a flow chart 9 is provided for the automatic creation of an optimized venting channel (vent) in the hearing instrument by use of software run in a computer. In the first block 10, LOAD WORK ORDER, an order entry is received from a customer. A physical impression of a patient's ear canal is converted to a so-called "point cloud", which is a computer image data file of points on an outside surface of the physical impression. This point cloud data file is then loaded into the computer at block 10.

At block 117 "DETAIL CANAL AND CREATE STARTER SHELL", from the point cloud data file a surface file is created by use of a plurality of triangles defined by adjacent point cloud triplets. This surface file describes a continuous outer surface of a starter version of the housing shell 8 (see FIGS. 2, 3). Unnecessary material is removed from the canal area of the end 8A of the shell near the ear canal.

At block 12, "BUILD THE REGULAR ROUND VENT OF A MINIMAL CROSS-SECTION AS A STARTER VENT IN THE STARTER SHELL" the computer constructs an initial vent or what is known hereafter as a "starter" vent 3 which is preferably substantially round in cross-section or approximately cylindrical of relatively small dimensions and runs from the end 8A of the starter shell 8 (FIGS. 2, 3) nearest the ear drum to a starter end 8BB lying beyond the outer end 8B of the shell (see FIGS. 2, 3) where what is known as a faceplate 16 (FIGS. 2, 3, and 4) is to be mounted in a later step. This regular round vent 3 is of an initial minimal size and represents a starting point for the software construction (starter vent).

Figure 2:
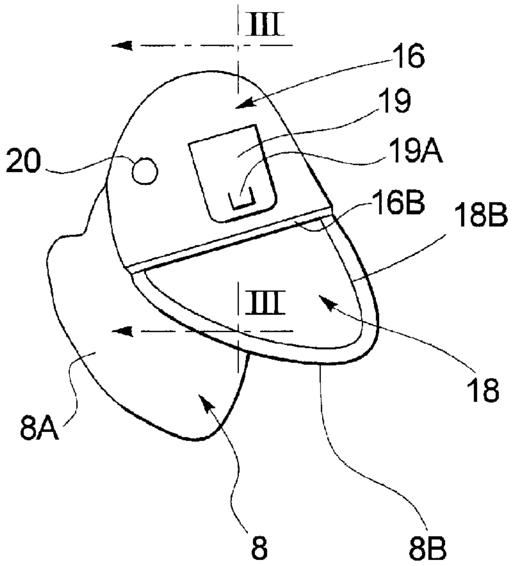
FIG. 2 is a perspective view of the hearing aid showing an outer housing shell and an outer end of a vent-as-large-as-possible running through the hearing aid.

In block 13, "GO BACK TO DETAILING AND SHAPE THE STARTER SHELL AROUND WHERE THE FACEPLATE WILL BE MOUNTED USING VENT PREVIEW", a shape of an outer end 8B of the shell where the faceplate 16 is to be provided is designed. As shown in FIGS. 2, 3, the faceplate 16 glued on the shell will have an edge 16B adjacent to and defining one side of an aperture at an outer end 18B of the vent 18 open to the atmosphere, along with a trap door 19 with a finger-nail lift tab 19A which swings open for access to a battery. Other components such as a volume control and a push button, and a microphone opening 20 are mounted on the faceplate. Note that the faceplate may contain or have mounted on it also other controls besides the microphone: push buttons, volume control, etc. Components including a hybrid, telecoil, reed switch, and an electronics module 5 with battery are provided in a free space 21 (see FIG. 3) exterior to the vent 18 defined by vent wall 18C. The electronics module may be part of the faceplate or attached directly below it in space 21. The receiver 7 is also provided down further inside the housing shell in the free space 21.

In block 13, the continuous shell surface is created using the previously mentioned triangulation technique. Material is also removed near the area where the faceplate is to be mounted to provide room for an opening for the vent and components to be mounted on the faceplate.

In block 14, "GO TO THE COMPONENTS STEP AND FINALIZE LOCATION OF COMPONENTS AS DEEP AS POSSIBLE IN THE STARTER SHELL", the program does what is necessary to push the components as deep as possible into the starter housing shell without interfering with the starter vent 3.

At block 15, "REMOVE PORTIONS OF THE STARTER SHELL BEYOND WHERE THE FACEPLATE IS TO BE MOUNTED AND MOUNTING THE FACEPLATE", a starter shell portion 4 having starter shell end 8BB beyond where the faceplate 16 is to be located are removed and the faceplate 16 is mounted.

At block 160, "GO TO THE NEXT STEP AND LET VENT TAKE UP SUBSTANTIALLY ALL FREE SPACE AVAILABLE TO CREATE THE VENT-AS-LARGE-AS POSSIBLE", an algorithm looks at the shell 8, the location of the components, and the location of the minimal round vent, and increases a size of the starter vent 3 defined by wall 18C so that it occupies the space substantially not occupied by the components such as module 5 and the receiver 7 with receiver tube 7A which are situated in free space 21 inside the shell 8 (see FIGS. 2, 3). The thus maximized vent 18 is shown by the vent wall 18C contour in FIG. 3. Note also that the vent wall 18C at a central region of the shell is part of a separating wall 18CC separating the vent-as-large-as-possible 18 from the free space 21. Also note that the receiver tube 7A running from the receiver 7 down to the canal end 8A of the shell near the ear drum lies just outside the separator wall 18CC partially defining the vent-as-large-as possible 18. Also note electronic cable 7D from electronics module 5 running down to the receiver 7.

In block 170, "SELECTIVE FILL AND LABELING", a selective fill and/or labeling is processed. Fill material is shown in FIG. 3 at the cross-hatched regions 23. Note that selective fill and labeling are optional steps, and therefore can be skipped.

FIGS. 2 and 3 show the vent-as-large-as-possible at 18. At the canal side end 8B of the shell 8, for the vent-as-large-as-possible 18 (nearest the eardrum) an operator of the software does a cut to create a cut plane 22 identical to a cut currently performed for the known collection vent (regular round vent) previously described. On the faceplate side of the vent-as-large-as-possible shell, the operator does another cut to create another cut plane 23 in order to accommodate the large outlet end 188 of the vent-as-large-as possible 18. Here the faceplate 16 has side edge 16B defining one side of the vent 18 aperture at the end 18B. This is shown in FIGS. 2 and 3.

FIG. 3 will now be described in more detail. FIG. 3 shows the housing shell 8 with the end 8A closest to the ear drum at the bottom and the end 8B at the faceplate 16 at the top after removal of the portion 4 (shown in dashed lines) of the starter shell 8. Components of the hearing aid such as the electronics module 5 are shown in this drawing figure in space 21. The 45 degree cut plane 22 is provided on curved surface 19 at the housing shell canal side 8A at the bottom. The region or free space 21 shows where the electronics module 5 and receiver 7 are to be housed. The substantially horizontal rectangle panel illustrated at the top is the faceplate 16. Note that during the shell assembly after the faceplate is glued to the shell all faceplate material 16A outside of the shell is trimmed away. The trap door 19 with finger nail protrusion 19A is shown at the top of the faceplate 16. The two cut planes 22 and 23 are provided. In the preferred embodiment the first cut plane is the 45 degree cut plane 22 described above, and the second cut plane 23 is shown at edge 16B of the faceplate 16 at the left side of the drawing and slanting slightly down from edge 16B. Note that other angles of cuts are also acceptable. The vent-as-large-as-possible 18 is defined by the vent wall 18C in FIG. 3 and runs from this second cut plane 23 next to the edge 16B of the faceplate 16 at the outside end 18B of the vent, down to the 45 degree cut plane 22, which is the vent end 18A at the canal side near the eardrum. The top cut plane 23 next to the faceplate 16 at edge 16B is called a low angle cut plane.

The material shown as cross-hatching in FIG. 3 and exterior to the vent wall 18C is either part of the housing shell 8 or the separator wall 18CC.

Where the cut planes are provided depends upon a location of electronics such as electronics module 5, optional components, receiver 7, receiver hole 6, receiver tube 7A, and values of different preferences parameters that define a shape of the vent 18, vent end 18A and vent end 18B.

Vent design for the vent-as-large-as-possible of the preferred embodiment is very different from vent design for the previously mentioned prior art collection vent. A main difference is that for the collection vent design, an algorithm finds just a biggest contour that can accommodate the vent inlet. In the case of the vent-as-large-as-possible of the preferred embodiment herein, the vent inlet contour can be smaller than the vent inlet for the collection vent, because one needs to avoid collisions with the components and receiver hole, and adhere to other preferences settings not used for the collection vent. Another important difference between the existing prior art vents and the new vent-as-large-as-possible is that prior art vents are built without any consideration of component positions. The vent is built first, and then components are placed into the shell in the prior art. In the vent-as-large-as-possible first the starter vent is placed, then components such as volume control, push button, receiver, electronics module with battery, and microphone are placed as deep as possible in the starter shell, then the starter shell is cut to remove portions beyond where the faceplate is to be located, and then the starter vent is transformed into the vent-as-large as possible.

The shape of the vent end at 18A and vent end at 18B in FIG. 3 is defined following preferences settings. The term "preferences settings" means for the design software of the present preferred embodiment, the particular parameters chosen by the operator defining how different algorithms in the software perform functions.

FIG. 4 shows the housing shell 8 oriented with the ear canal end 8A at the bottom and the faceplate end 8B at the top. This drawing figure shows the approximate 45 degree cut plane 22 described previously at the ear canal end 8A and indicates by dashed line 24 with three vertical slashes 50% of the canal width at the vent end 18A to show where the cut plane 22 begins for the approximate 45 degree cut.

FIGS. 3 and 4 above show the design steps for the vent-as-large-as-possible wherein respective planar ruled surface cuts (cut planes) are used to maximize vent inlet/outlet areas.

The workflow for vent placement design by the software for the vent-as-large-as-possible will again be described, but with some additional details with reference to FIG. 1:

1. detail canal (FIG. 1—block 11);
2. go to vent step and place a starter vent, which is in a preferred embodiment a regular round vent (FIG. 1—block 12), possibly accompanied with canal tip modification, receiver and receiver hole placement—the starter vent is preferably the regular round vent of minimal cross-section;
3. go back to detailing, starter vent preview shown during the detailing (FIG. 1—block 13);
4. place electronics, hybrid, optional components and finish detailing—trim shell around the faceplate (FIG. 1—block 14);
5. go to the faceplate mounting step (FIG. 1—block 15) and after the faceplate mounting step the starter vent (regular round vent—block 12 in FIG. 1) is replaced with the vent-as-large-as-possible (FIG. 1—block 160); and
6. proceed to a selective fill and/or labeling step (FIG. 1—block 170—a selective fill and labeling) which is selecting an area with a plane and filling it with material, and the labeling is the step of assigning an identification for the shell by engraving or embossing on an inside surface of the shell housing.

The software method of the preferred embodiment ensures that the vent-as-large-as-possible takes as much as possible space in the shell adhering to the constraints provided in the requirements (preference settings).

The software provides the ability to place the vent-as-large-as-possible starter vent (regular round vent) inside the shell in the following manner:

A. a starter section (regular round vent) is equal to a minimal cross-section area of the vent-as-large-as-possible defined in the preferences—for example if the minimal cross-section area as defined in the preferences is S, then a radius of a regular round vent is computed from the formula S=PI*r^2, where r is the radius of the regular vent, and PI is 3.1415926;

B. a vent is always shown during a preview in detailing the vent-as-large-as-possible if the user has already placed the starter vent (regular round vent);

C. the software does not show the vent at all during the vent preview—in detailing the user has not yet placed the starter vent (regular round vent) for the vent-as-large-as-possible;

D. the software allows the user to place the starter vent (regular round vent) during the vent step—the software generates the vent-as-large-as-possible from the starter vent (regular round vent); and E. The software builds the vent-as-large-as-possible on all shell types (CIC, Mini-Canal, Canal, Half-Shell, Full-Shell).

The software builds the vent-as-large-as-possible similar to a collection IROS (an IROS vent is an Ipsolateral Routing of Signal vent):

A. in the preferences the settings are provided for a maximal curvature of the vent end 18A wall—the software ensures that the inlet end 18A wall of the vent-as-large-as-possible does not violate a maximal curvature of the vent inlet end 18A wall defined in the preferences;

B. in the preferences the settings are provided for the maximal curvature of the vent outlet end 18B wall—the software ensures that the outlet 18B wall of the vent-as-large-as-possible does not violate the maximal curvature of the vent outlet end 18B wall defined in the preferences; and C. the software builds the vent-as-large-as-possible inside the shell 8 similarly to a non-continuous D-shape vent as a straight segment with optional connecting segments—a D-shape vent is a vent which is built as a wall inside the shell with openings at the faceplate and the canal side,—normally this vent has a shape of a "D".

FIG. 5 shows a view of the vent-as-large-as-possible 18 inside the shell 8 at a cross-section shown in FIG. 3 at section line V-V at a lower part of the shell 8 near the ear canal end 8A. The receiver 7 is shown alongside the vent separator wall 18CC in free space 21.

The software of the preferred embodiment ensures or provides the following:

A. that the vent-as-large-as-possible has no collisions with any of the components (including receiver hole 6);

B. in the preferences, settings are provided for minimal cross-section area inside the vent in $mm^2$;

C. in the preferences, the settings are provided for maximal cross-section area inside the vent in $mm^2$;

D. in the preferences, different settings are provided for the vent-as-large-as-possible minimal and maximal cross-section area depending upon the shell type—this vent-as-large-as-possible minimal cross-section depending on the shell type is shown in FIG. 6 which shows a table of shell type indicated vertically and maximal cross-section and minimal cross-section that the software could adhere to indicated horizontally;

E. the vent inlet end 18A and outlet end 18B for the vent-as-large-as-possible 18 does not go outside the suggested vent inlet and outlet cut planes 22 and 23;

F. in the preferences the settings are provided for maximal allowed absolute gradient of two adjacent vent cross-section areas; and G. the vent-as-large-as-possible generation algorithm (FIG. 1—block 160) ensures that an absolute gradient of adjacent vent slice areas is lower than a preference value—a gradient of adjacent vent slice areas is calculated as (a2−a1)/d, where a2 and a1 are areas of adjacent cross-sections, and d is a distance between cross-sections—if the absolute gradient of adjacent cross-section areas is higher than certain thresholds than this means that in these particular cross-sections the vent makes a large bend—it is desirable that the vent be smooth, therefore with the maximal and minimal ratio one is able to control the smoothness of the vent.

The software also provides for the following:

A. ensures that the hearing aid receiver 7 can be inserted into the shell 8 up to its final location given the vent-as-large-as-possible 18 placement;

B. ensures that the vent generation algorithm does not modify a position of components during the vent-as-large-as-possible 18 integration;

C. allows the user to apply the vent-as-large-as-possible 18 with one mouse click, provided that the starter vent (regular round vent) is already placed—the user interface comprises one button that applies the vent-as-large-as-possible, or the user may go from the faceplate step (FIG. 1—block 15) to the selective fill step (FIG. 1—block 170) and the vent-as-large-as-possible may be applied;

D. allows the user to remove the vent-as-large-as-possible 18 from the shell 8 if no other operation has been applied to the shell 8 after the vent-as-large-as-possible 18 is placed—this can be implemented with an undo button;

E. does not allow adaptive vent tapering on the vent-as-large-as-possible 18 (although the resulting shell 8 of the vent-as-large-as-possible 18 may look similar on the vent inlet end 18A side to the adaptive vent tapering);

F. allows to put into a script file the placement of the vent-as-large-as-possible 18 starter vent (regular round vent);

G. allows the user to position the receiver 7, electronics, hybrid and all optional components prior to the generation of the vent-as-large-as-possible 18 from the starter vent (regular round vent)—the user is not allowed to position the receiver 7, electronics, hybrid and all optional components after the generation of the vent-as-large-as-possible from the starter vent (regular round vent); and H. does not allow the vent-as-large-as-possible 18 in a combination with RSA (RSA means Receiver Suspension Assembly which is a series of design steps for receiver placement).

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected

We claim as our invention:

1. A method for designing a hearing instrument shell for a hearing instrument for insertion into an ear canal of a user, the hearing instrument further comprising a faceplate and hearing instrument components positioned within the shell, comprising:

creating a computerized virtual model of the shell, the model comprising a shell wall comprising an outer surface conforming in part to the ear canal and a shell wall interior surface;

a shell interior within the shell for selectively receiving the hearing instrument components;

a first, general closed canal end comprising a tip facing into the ear canal and comprising a vent opening; and a second, open end for receiving a faceplate;

creating a vent within the shell interior adjacent or nearly adjacent the shell interior wall surface, the vent comprising an initial, approximately cylindrical section comprising a vent wall;

a first end connected to the vent opening in the tip; and a second end extending to the second, open end of the shell;

after creating the vent, designating a location for positioning the electrical components in the shell interior volume adjacent the shell wall interior surface apart from the vent and arranging the components in a configuration occupying the least amount of volume of the shell interior; and after designating a location for positioning the electrical components, expanding the cross-section of the vent to utilize a maximum volume of unoccupied space in the shell interior.

2. A method as set forth in claim 1, further comprising creating a separator wall between the vent and the electrical components.

3. A method as set forth in claim 1, where designating a location for positioning the electrical components further comprises designating a location above the canal end of the shell.

* * * * *